Aug. 29, 1967

B. L. SAJULAN 3,337,982

FISH TRAP

Filed Feb. 1, 1965

INVENTOR.
Bruno L. Sajulan
BY
Webster & Webster
ATTORNEYS

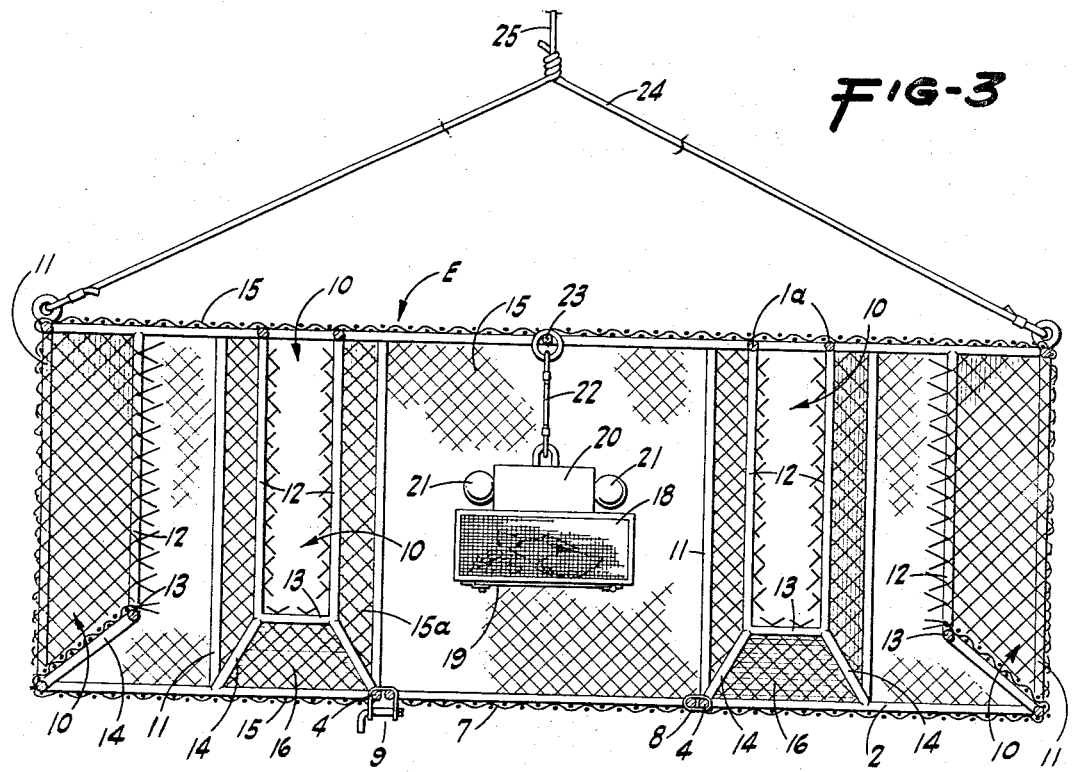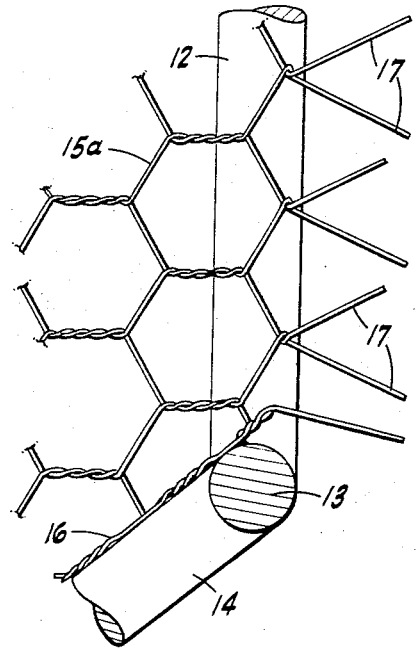

United States Patent Office 3,337,982
Patented Aug. 29, 1967

3,337,982
FISH TRAP
Bruno L. Sajulan, 1846 E. 8th St.,
Stockton, Calif. 95206
Filed Feb. 1, 1965, Ser. No. 429,555
2 Claims. (Cl. 43—65)

ABSTRACT OF THE DISCLOSURE

A fish trap, particularly for commercial fishing, having a foraminous enclosure, fish entry passages leading into the enclosure while preventing fish from leaving the enclosure, and an illuminated bait container in the enclosure.

---

The major object of the invention is to provide a device for the purpose so constructed that while fish can freely enter the trap, lured thereinto by bait retained within the trap as well as by flashing lights therein, such fish are prevented by novel means from escape from the trap.

Another object of the invention is to provide a fish trap which can be readily emptied of its contents when raised to the surface of the water.

A further object of the invention is to provide a bait container within the trap so constructed that—while the fisherman can readily load or remove the bait when necessary—entrapped fish cannot actually contact the bait to consume the same, and fish outside the trap can smell and even see the bait in such container.

An additional object of the invention is to provide a novel fish trap of suspended type; the construction of the trap being such that—although of relatively light weight so that it may easily raised and lowered—it is quite rigid, holds its shape, and will remain stable at the underwater level to which it is lowered.

A further object of the invention is to provide a fish trap which is designed for ease and economy of manufacture; the trap being capable of construction in different sizes.

A still further object of the invention is to provide a practical, reliable, and durable fish trap and one which is exceedingly effective for the purpose for which it is designed, and which can be used in varying depths of water.

These objects are accomplished by means of such structure and relative arrangement of parts as will fully appear by a perusual of the following specification and claims.

In the drawings:

FIG. 3 is a longitudinal sectional elevational of the fish trap on an enlarged scale and taken on line 3—3 of FIG. 1.

FIG. 4 is a fragmentary enlarged vertical section of one of the fish-entry passages of the fish trap.

Figure 1:
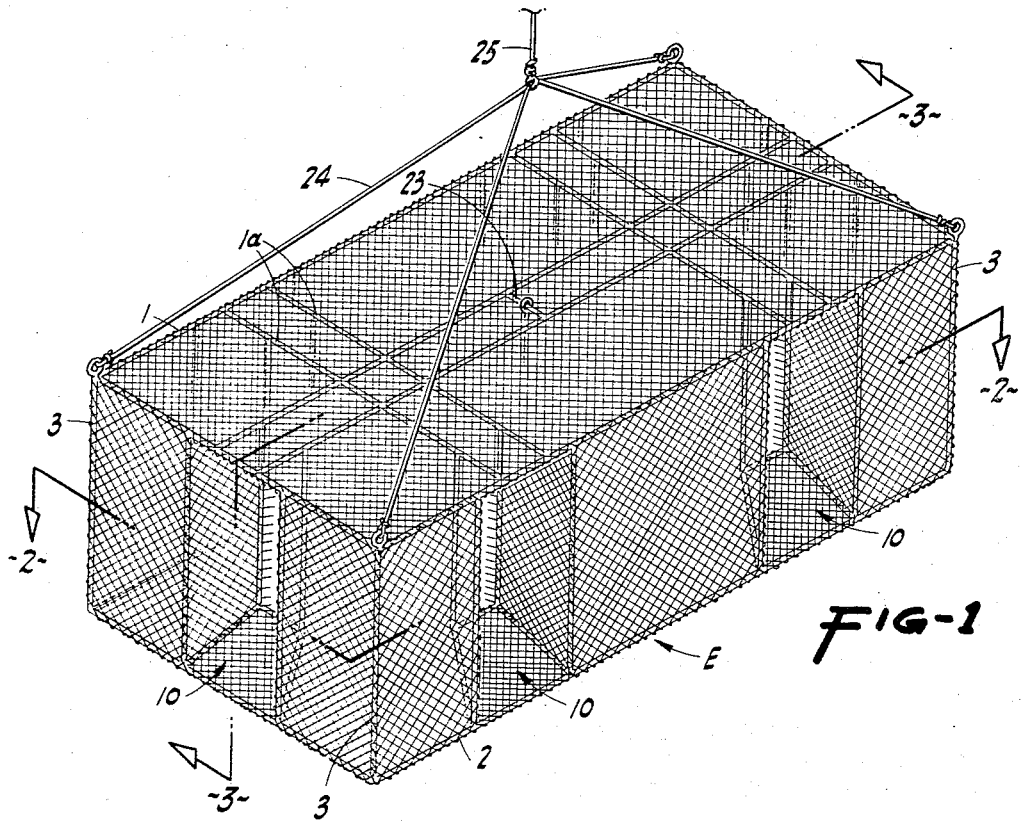
FIG. 1 is an isometric perspective view of the improved fish trap.

Referring now more particularly to the drawings and to the characters of reference marked thereon, the fish trap comprises an enclosure E having a rectangular main frame consisting of a top endless member 1 of rectangular form, a similar lower member 2 of the same size and form, and end posts 3 connecting the members 1 and 2 at the corners thereof; all said members and posts being made of round metal rods.

Intermediate the ends of the trap, longitudinally spaced cross rods 4 extend betweeen and are connected to the sides of the lower frame member 2, and transversely spaced longitudinal rods 5 extend between and are connected to the rods 4; a rectangular opening 6 being thus formed in the trap at the bottom thereof. This opening is normally closed by a downwardly opening door 7 which at one end is hingedly connected to the adjacent cross rod 4, as shown at 8, and at the other end is releasably connected to the related cross rod 4 by a suitable latch device indicated at 9 in FIG. 3.

The fish trap is provided with a number of spaced fish-entry passages in its sides and ends, and indicated generally at 10. Each such fish-entry passage 10 is outlined at its outer end by a pair of spaced vertical posts 11 which extend between and are connected to the upper and lower frame members 1 and 2. The inner end of each passage 10 is outlined by another pair of vertical posts 12 which are symmetrically disposed relative to the posts 11 but somewhat closer together, as clearly shown in FIG. 2. The posts 12—at their upper ends—are connected to correspondingly spaced horizontal bars or rods 1a which extend between the sides of and are rigid with the top frame member 1, and which in effect form part of said frame member. The posts 12 are, of course, inside the fish trap itself, and terminate at their lower ends some distance above the horizontal plane of the lower frame member 2. At said lower ends, the posts 12 are connected by a horizontal cross rod or bar 13, and downwardly extending laterally diverging rods 14 connect the posts 12 and bar 13 at their junction, with the posts 11 and lower frame member 2 at their junction with each other.

The fish trap area—outlined by the frame members 1 and 2 and the end posts 3—is enclosed by a covering of metal netting 15 which is preferably of the type known as "chicken wire," as shown in FIG. 4. The vertical portion of the netting does not, however, extend across the various fish-entry passages 10, but is bent about the posts 11 and extends to the inner posts 12 so as to form the sidewalls 15a of the different passages. The flooring or bottom portions 16 of the passages 10 are formed by similar netting which slopes upwardly from the lower frame members 2 to the different cross bars 13 and extends the full distance between the sloping bottom-edge rods 14 of the passages 10.

Figure 2:
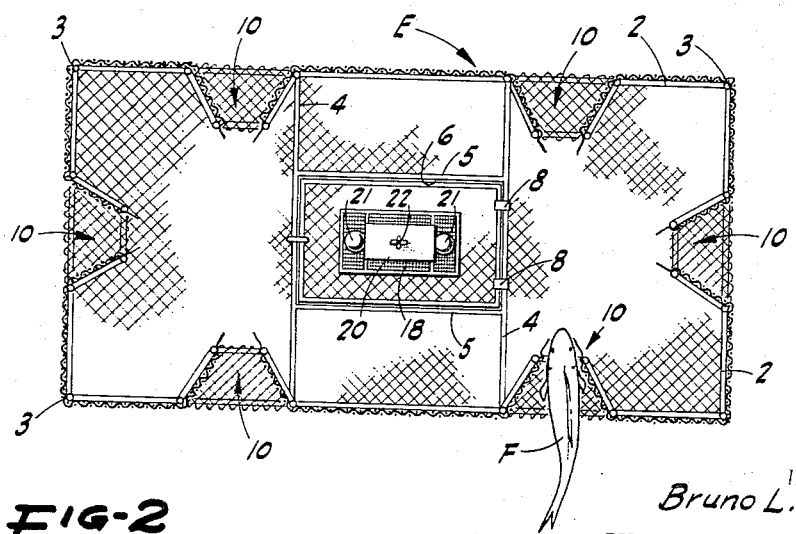
FIG. 2 is a sectional plan of the fish trap—taken on line 2—2 of FIG. 1—on a reduced scale; the view depicting a fish as entering the trap.

At the inner ends of the sidewalls of the passages 10, the corresponding netting portions are cut to form rows of fingers or prongs 17. These prongs, which are naturally relatively stiff yet somewhat flexible and resilient, project inwardly beyond the posts 12 (as shown in FIG. 4) and are normally disposed at substantially the same angle of convergence as are the sidewalls of the passages, as shown in FIG. 2.

Disposed in the fish trap substantially centrally of its area is a metal-net covered bait box or container 18 of rectangular form which—on the bottom is provided with a normally closed and latched door 19.

A battery-operated flashing-light unit 20 of watertight form is mounted on the top of the bait box; said unit including exposed light bulbs 21. The flashing-light unit 20, together with the bait box 18, is suspended from the top of the fish trap by means of a hanger 22 depending from a transverse rod 23 extending between and rigid with the longitudinal rods 1a.

The fish trap is supported at any desired depth below the surface of the water by means of a plurality of corner-connected upwardly converging cables 24 (or the like) which at their junction are connected to a supporting cable 25 which depends from a float, a boat-mounted derrick, or other suitable means; the form and construction of which will depend on the size of the trap being handled. This size in turn will depend on the size of the fish intended to be trapped, or the number of fish desired to be trapped with a single immersion of the fish trap.

With the trap constructed as described, and when it is lowered into the water to the desired depth, fish in the vicinity will be attracted by the bait and flashing lights and will swim about the trap seeking entry thereto. Upon reaching one of the passages or entryways 10, a fish F will naturally swim through the same in an endeavor to reach the bait, as indicated in FIG. 2. Such fish can pass into the trap past the prongs 17 without interference, even though they may touch or even be deflected laterally by the fish; this for the reason that said prongs slope in the same direction as that in which the fish is moving. When, however, the fish—after having entered the trap—attempts to swim out through any passage 10, the prongs 17 (then facing toward the fish and having relatively sharp ends) will contact and prick the skin of the fish causing the latter to back away or recoil from the passage and remain in the trap. The greater the force exerted by the fish in its attempt to escape, the greater will be the penetrating action of the prongs as they become deflected toward each other from opposite sides of the passage opening.

It will be understood that irrespective of the size of the fish trap, the width of the passages 10 at their inner ends will be according to the general size and width of fish which it is desired to trap.

To unload the trap, it is merely raised to the surface and the door 7 opened over a catch box and into which the entrapped fish are discharged through opening 6. If necessary, the bait box 18 is refilled before the trap is again lowered into the water for the next catch.

It should also be noted that the term "fish" as used herein is intended to include crabs and the like and for which the trap may be made with relatively wide entry passages.

From the foregoing description, it will be readily seen that there has been produced such a fish trap as substantially fulfills the objects of the invention, as set forth herein.

While this specification sets forth in detail the present and preferred construction of the fish trap, still in practice such deviations from such detail may be resorted to as do not form a departure from the spirit of the invention, as defined by the appended claims.

Having thus described the invention, the following is claimed as new and useful and upon which Letters Patent is desired:

1. A fish trap including an enclosure having a top wall, foraminous vertical walls, a horizontal bottom wall, and fish entry passages projecting into the enclosure from said vertical walls; each of said passages comprising a pair of laterally spaced rigid uprights defining the entry end of the passage and secured at their ends to the top and bottom walls, another pair of wall-supported laterally spaced rigid uprights disposed closer together than the first named uprights and defining the inner end of the passage, said other uprights being secured at one of their ends to the top wall and with their other ends terminating above the bottom wall of the enclosure, rigid rods connecting the lower ends of the first and second named uprights, and netting secured to and extending between and engaging against the uprights and rods lengthwise and transversely of the passage and forming the walls thereof.

2. A fish trap, as in claim 1, including a downwardly opening door mounted on the bottom wall substantially centrally between said vertical walls, and a bait container hung from the top of the enclosure directly above and spaced from the door.

References Cited

UNITED STATES PATENTS

| | | | |
|---|---|---|---|
| 846,556 | 3/1907 | Dollar | 43—100 |
| 887,232 | 5/1908 | Crowson | 43—65 |
| 1,412,649 | 4/1922 | Bitonti | 43—66 |
| 2,760,297 | 8/1956 | Buyken | 43—105 |
| 3,177,604 | 4/1965 | Ewing | 43—41 X |

FOREIGN PATENTS

| | | |
|---|---|---|
| 596,334 | 4/1960 | Canada. |
| 54,816 | 6/1937 | Norway. |

SAMUEL KOREN, *Primary Examiner.*

WARNER H. CAMP, *Examiner.*